March 3, 1931.  F. E. NEWTON  1,794,794
HOPPER FEED
Filed Feb. 26, 1930  2 Sheets-Sheet 1
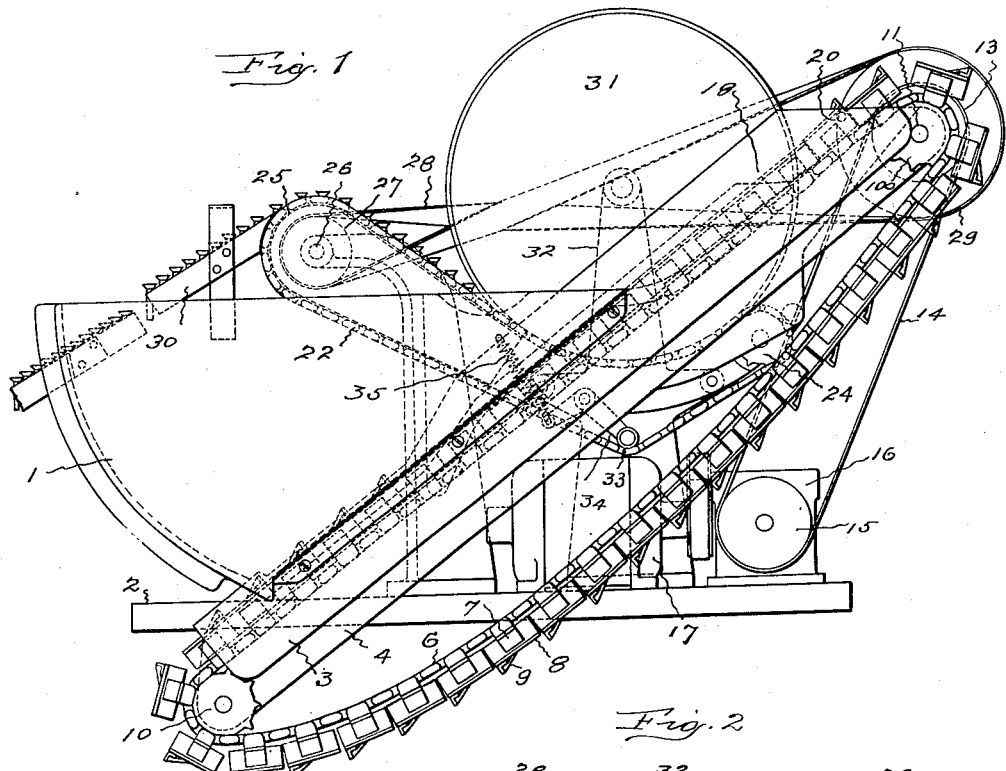
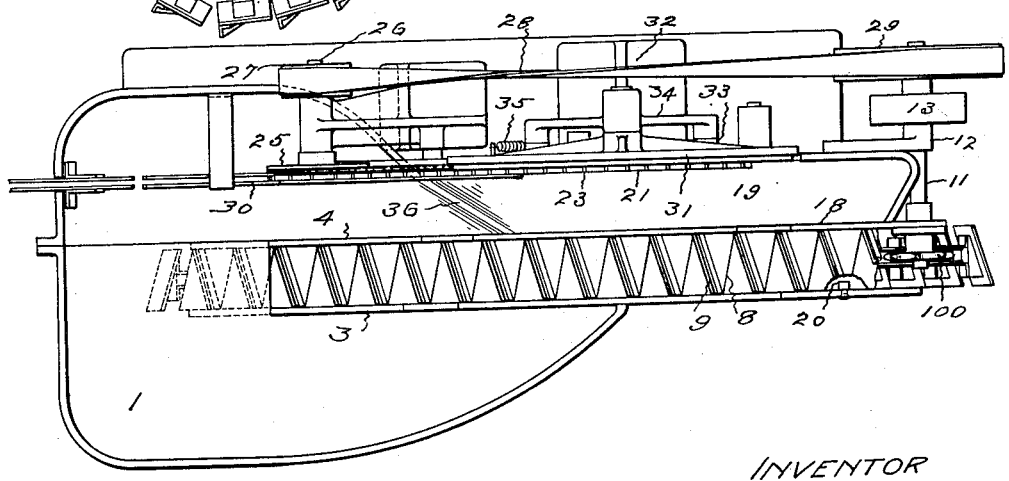
INVENTOR
Frank E. Newton,
Harry R. Williams
atty.

March 3, 1931.  F. E. NEWTON  1,794,794
HOPPER FEED
Filed Feb. 26, 1930  2 Sheets-Sheet 2
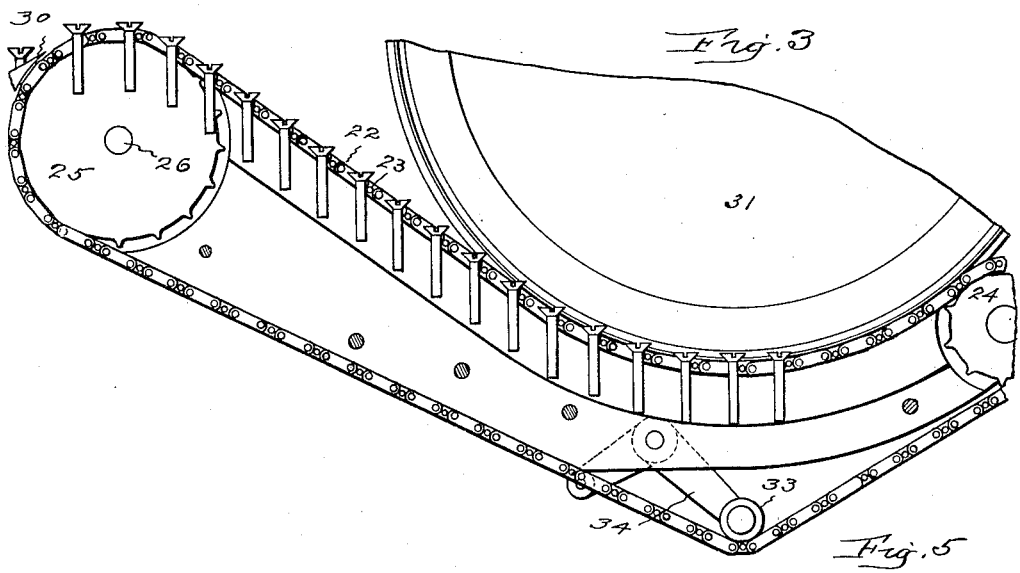
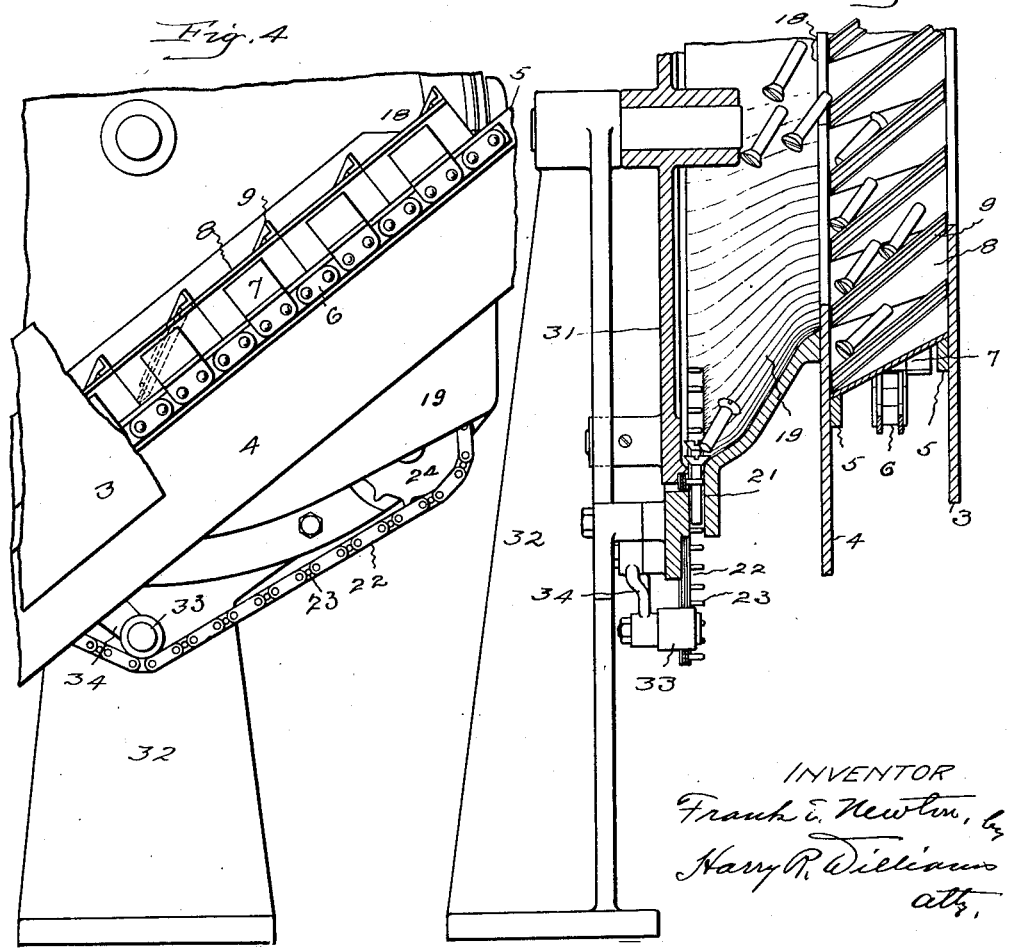
INVENTOR
Frank E. Newton
by Harry R. Williams
atty.

Patented Mar. 3, 1931

1,794,794

UNITED STATES PATENT OFFICE

FRANK E. NEWTON, OF HARTFORD, CONNECTICUT

HOPPER FEED

Application filed February 26, 1930. Serial No. 431,418.

This invention relates to a mechanism for taking small articles from a promiscuous mass in a hopper and feeding them in proper relation for subsequent treatment or manipulation.

The object of the invention is to provide a mechanism for this purpose which will feed the articles very rapidly and arrange them so that they will be uniformly presented to the machine to which the mechanism is applied. The articles handled by this mechanism may be of various shapes and sizes, and may be finished or partly finished, for example, they may be finished screws or rivets which it is desired to count, or screw or bolt blanks which are to be threaded or have other operations performed on them.

The embodiment of the invention which is illustrated has a supply hopper in which the articles to be handled are deposited in a promiscuous mass, with an endless elevator that passes through the supply hopper and carries up the articles in limited quantities and discharges them into a feed hopper. An endless conveyer passes through the feed hopper and picks up the articles in succession and carries them to a discharge runway or chute. At the bottom of the feed hopper is a slot designed to receive the shanks of the articles and arrange them so that they will be engaged by the feed conveyer all headed alike, and turning at one side of the feed hopper is a disk that assists in arranging the blanks so that they will be quickly positioned in the path of the feed conveyer.

In the accompanying drawings Fig. 1 shows a side elevation of the mechanism. Fig. 2 is a plan of the same. Fig. 3 is a side view of the feed conveyer and a portion of the positioning disk. Fig. 4 is a side view of a portion of the supply elevator. Fig. 5 is a vertical transverse section of the supply elevator, the feed hopper, and the positioning disk.

The supply hopper 1 into which the articles to be handled are deposited is mounted on a base 2. Extending on an incline through the supply hopper from below the lowest point to above the highest point are plates 3, 4 on the inside of which are track bars 5. Arranged to run between the plates and on these track bars is the supply elevator which consists of an endless chain 6, blocks 7 fastened to the chain links, plates 8 fastened to the blocks and wings 9 secured to the plates obliquely with relation to the path of the chain. The chain passes around the lower idle sprocket wheel 10 and the upper sprocket wheel 100, the latter sprocket being fastened to a shaft 11 that is supported near one end by the plate 4 and near the other end by a bracket 12. On this shaft is a pulley 13 that by the belt 14 is connected with a pulley 15 which is rotated through the reduction gear box 16 by the motor 17.

When the machine is running the elevator plates and wings passing through the mass in the supply hopper carry articles up to the locality 18 where the plate 4 is cut away. As the articles reach this locality they slide from the oblique elevator wings into the feed hopper 19. A pin 20, Figs. 1, 2, is desirably fastened to the inside of the outer track plate 3 opposite the discharge locality in the path of the elevator plates so as to engage the plates when they reach this locality and give them a slight kick or tilt which will facilitate the sliding of the articles from the elevator into the feed hopper.

The feed hopper slopes downward and backward from the plate 4 which separates it from the supply hopper. Along the rear edge at the lowest part of the feed hopper is a slot 21 of a width sufficient to receive the shanks but not the heads of the articles, so that the shanks will drop into the slot and the heads will remain above, as shown in Fig. 5. Extending at one side through the lower part of the feed hopper is an endless conveyer which consists of an endless chain 22, with pins 23 projecting transversely from the links. The chain passes around an idler sprocket 24, and a sprocket 25 that is fastened to a shaft 26 which is provided with a pulley 27 that is connected by a belt 28 with a pulley 29 on the shaft 11. The transversely extending conveyer pins are arranged to pass through the slot 21 at the side of the lower part of the feed hopper so as to engage the shanks of the articles that drop into the slot between the pins, Fig. 5. The conveyer carries the articles up and discharges them in uniform succession to a track or runway 30.

A disk 31 that forms part of the back wall of the feed hopper, is rotatably supported by a bracket 32 which is mounted on the base. This disk runs idle and its periphery is engaged with the upper section of the conveyer chain so that it is rotated by the movement of the conveyer chain and tends to twist and turn the articles in such a manner that the shanks more readily drop down into the slot in the bottom of the feed hopper and between the pins of the feed chain. A roll 33 on the end of an angle lever 34 is arranged to engage the lower section of the conveyer chain, the other end of the lever being connected with a spring 35 which is tensioned so as to cause the roll to press against the chain and hold it sufficiently tight to rotate the disk.

The lower part of the feed hopper slopes somewhat abruptly up to the supply hopper and this wall forms a dam 36, Fig. 2. When more articles are discharged by the elevator into the feed hopper than the feed conveyer can take care of, the surplus articles are crowded up this wall over the dam and fall back into the supply hopper.

The supply elevator may be run relatively slow to carry up the required quantities of articles from the mass in the supply hopper, regardless of the weight and quantity in the supply hopper, and the feed conveyer can be run fast so as to carry away practically all of the articles that are discharged by the elevator into the feed hopper. As the result of this the articles are rapidly and uniformly delivered to the runway or feed chute that is to conduct them to the machine which is to further treat or manipulate the articles.

The invention claimed is:

1. Mechanism for feeding articles which comprises a casing with a supply compartment and a feed compartment arranged side by side and open to each other in the casing, an endless chain movable on an incline from below the bottom to above the top of the supply compartment, means on said chain for carrying articles up from the supply compartment and depositing them in the feed compartment, means in said feed compartment for positioning the articles deposited therein, an endless chain movable on an incline from below the bottom to above the top of the feed compartment, means on said chain for engaging the positioned articles and carrying them up out of the feed compartment, and means for receiving the articles carried up from the feed compartment.

2. Mechanism for feeding articles which comprises a casing with a vertical partition separating a portion of the interior into a supply compartment and a feed compartment, an endless chain movable on an incline from below the bottom to above the top of the supply compartment, means on said chain for carrying articles up from the supply compartment and depositing them over said partition into the feed compartment, means in said feed compartment for positioning the articles deposited therein, an endless chain movable on an incline from below the bottom to above the top of the feed compartment, means on said chain for engaging the positioned articles and carrying them up out of the feed compartment, and means for receiving the articles carried up from the feed compartment.

3. Mechanism for feeding articles which comprises a casing containing a supply compartment and a feed compartment arranged side by side, an endless chain movable obliquely upward from below the bottom to above the top of the supply compartment for carrying articles up from the supply compartment and depositing them in the feed compartment, an endless chain movable obliquely upward from below the bottom to above the top of the feed compartment, and a low wall separating said compartments from each other at the bottom whereby when more articles are deposited in the feed compartment than the chain which runs therethrough carries away the accumulated articles will be returned over said wall to the supply compartment.

4. Mechanism for feeding articles which comprises a supply hopper for receiving the articles, a feed hopper adjacent to the supply hopper, an elevator for carrying the articles from the supply hopper and depositing them in the feed hopper, a conveyor for carrying the articles from the feed hopper, a rotatable disk for positioning the articles in the feed hopper, and means for receiving the articles from the conveyer.

5. Mechanism for feeding articles which comprises a supply hopper for receiving the articles, a feed hopper adjacent to the supply hopper, an elevator for carrying the articles from the supply hopper and depositing them in the feed hopper, a conveyer for carrying the articles from the feed hopper, a disk engaged and rotated by the conveyer for positioning the articles in the feed hopper, and means for receiving the articles from the conveyer.

6. Mechanism for feeding articles which comprises a supply hopper for receiving the articles, a feed hopper adjacent to the supply hopper, an endless elevator for carrying the articles from the supply hopper and depositing them in the feed hopper, an endless conveyer for carrying the articles from the feed hopper, a rotatable disk in the feed hopper, means for causing the conveyer to frictionally engage and rotate said disk, and means for receiving the articles from the conveyer.

7. Mechanism for feeding articles which comprises a supply hopper for receiving the articles, a feed hopper communicating with the upper portion of the supply hopper, an endless elevator for carrying up the articles from the supply hopper, means near the discharge end of the elevator for tilting the elevator and causing the articles to be deposited in the feed hopper, an endless conveyer for carrying the articles from the feed hopper, and means for receiving the articles from the conveyer.

8. Mechanism for feeding articles which comprises a supply hopper for receiving the articles, a feed hopper adjacent to the supply hopper, said feed hopper having a slot at its bottom for receiving the shanks of the articles, an elevator for carrying the articles from the supply hopper and depositing them in the feed hopper, an endless conveyer with projecting pins that traverse said slot for carrying the articles from the feed hopper, a disk in the feed hopper, rotated by engagement with the conveyer for positioning the articles with relation to said slot, and means for receiving the articles from the conveyer.

9. Mechanism for feeding articles which comprises a supply hopper for receiving the articles, a feed hopper with a slotted bottom, adjacent to the supply hopper, an endless elevator with oblique wings for carrying the articles from the supply hopper and depositing them in the feed hopper, an endless conveyer with projecting pins that traverse said slot for carrying the articles from the feed hopper, a disk in the feed hopper rotated by peripheral contact with the conveyer for positioning the articles in the feed hopper, and means for receiving the articles from the conveyer.

FRANK E. NEWTON.